United States Patent [19]
Tomiyama et al.

[11] 3,792,371
[45] Feb. 12, 1974

[54] GAS LASER

[75] Inventors: Shunsuke Tomiyama; Akira Hashimoto, both of Tokyo; Manabu Yamamoto, Odawara, all of Japan

[73] Assignee: Hitachi, Limited, Tokyo-to, Japan

[22] Filed: Oct. 22, 1971

[21] Appl. No.: 191,927

Related U.S. Application Data

[63] Continuation-in-part of Ser. No. 832,662, June 12, 1969, abandoned.

[30] Foreign Application Priority Data
June 21, 1968 Japan.............................. 43-43290

[52] U.S. Cl. ................................ 331/94.5, 330/4.3
[51] Int. Cl. ......................... H01s 3/22, H01s 3/09
[58] Field of Search..................... 331/94.5; 330/4.3

[56] References Cited
UNITED STATES PATENTS
3,394,320  7/1968  Medicus............................ 331/94.5

OTHER PUBLICATIONS
Laures et al., C. R. Acad. Sci., Paris, Vol. 258, 1964 pp. 6363–6364.

Faust et al., Physical Review, Vol. 133A, Mar. 1964, pp. 1476–1486.

Bridges et al., Applied Optics, Vol. 4, No. 5, May 1965, pp. 573–580.

*Primary Examiner*—David Schonberg
*Assistant Examiner*—R. J. Webster
*Attorney, Agent, or Firm*—Robert E. Burns; Emmanuel J. Lobato

[57]  ABSTRACT

A large, continuous laser oscillation output of $Kr^+II$ gas can be obtained by exciting a mixture gas of krypton and helium filled in a capillary discharge tube at a total mixture gas pressure of less than 10 Torr with a direct current of 150 to 400 $A/cm^2$ in current density, the mixing ratio of helium with respect to krypton being from 0.5 to 5 times as high as that of krypton, and the gas-filled discharge tube being disposed between a pair of reflectors.

3 Claims, 4 Drawing Figures

GAS LASER

REFERENCE TO RELATED APPLICATION

This application is a continuation-in-part of our copending application Ser. No. 832,662 filed June 12, 1969 for "DISCHARGE TUBE OF GAS LASER," now abandoned.

BACKGROUND OF THE INVENTION

1. Field of Invention

This invention relates to a method for laser oscillation of Kr$^+$II gas and an apparatus to produce such laser oscillation.

It has become possible in recent days to continuously oscillate red laser light of Kr$^+$II having wavelength of 6471 angstroms and 6,764 angstroms with fairly large output. On the other hand, however, various problems exist with respect to the quality and structure of the discharge tube to be used for the laser oscillation as well as electric power to be consumed, since, in exciting krypton atom, a large electric power of greater than several kilo-watts is required for obtaining an electric discharge. In addition, apprehension of the instability phenomenon which is inherent in discharge plasma such as pinch effect and spiral instability to generate has made it extremely difficult from the technical standpoint to continuously produce stable laser light of Kr$^+$II with a high level of output. Incidentally, the spectral lines of this Kr$^+$II are discharged by transition of Kr II from 5P$^4$P$^°$ level to 5S$^2$P$_{3/2}$ level as well as from 5P$^4$P$^°$ level to 5S$^2$P$_{1/2}$ level according to the energy diagram of Kr II.

2. Discussion of Prior Arts

The Bridges et al. literature of "Applied Optics," Vol.4, No. 5, May 1965, pp 573 – 580 reports that, when helium is added to krypton at a pressure of 10 Torr or so, and is then subjected to pulsed d.c. excitation, spectral oscillations of 4,315A, 4,387A, 4,583A, and 4,695A were obtained in the discharge residual light, (i.e., at the time of interruption of the pulsed d.c. excitation) due to the transition at the energy levels of from 6S$^4$P to 5P$^4$P$^o$ as well as from 6S$^4$P to 5P$^4$D$^o$. There oscillations however are in violet and blue light, and are not continuous.

Laures et al. report in "Compt Rendus," Tome 258, pp 6363–4, (1964) that, when a mixture gas of helium and krypton is subjected to electric discharge, Kr$^+$ ion oscillation can be observed in the residual light. This oscillation, however, is neither red light of Kr$^+$II, nor continuous, and its oscillation output is small.

Further, U.S. Pat. No. 3,278,858 (Faust et al.) teaches the use of producing laser oscillation of krypton by mixing helium with krypton as an auxiliary gas. However, the patented invention does not suggest any expedient to oscillate Kr$^+$II. Particularly, from the recitation in claim 2 of the patent which says that helium is mixed with an active gas at a ratio of at least 100 : 1, the patented invention cannot effectively carry out oscillation of Kr$^+$II.

SUMMARY OF THE INVENTION

It is therefore a primary object of the present invention to provide a method for obtaining laser oscillation of Kr$^+$II with a large, continuous output.

It is another object of the present invention to provide a laser device capable of producing the abovementioned Kr$^+$II oscillation of large output.

The foregoing objects as well as details of the present invention will become more apparent from the following description of the present invention when read in conjunction with the accompanying drawing.

DETAILED DESCRIPTION OF INVENTION

The gist of the present invention is to dispose between a pair of reflectors a capillary discharge tube, in which a mixture gas of krypton and helium mixed at a divided pressure ratio of helium with respect to krypton of less than five times, is filled at a total mixture gas pressure of less than 10 torr, and then to cause direct current to flow from an external d.c. power source into the discharge tube at a current density of from 200 to 400 A/cm$^2$ so as to excite the mixture gas, whereby laser light of Kr$^+$II can be continuously oscillated at a larger output than in the case of using krypton gas alone.

The reason for limiting the gas pressure to be filled in the capillary discharge tube, the divided pressure ratio of helium to krypton, as well as the current density for the direct current excitation to the abovementioned values are as follows.

Figure 1:
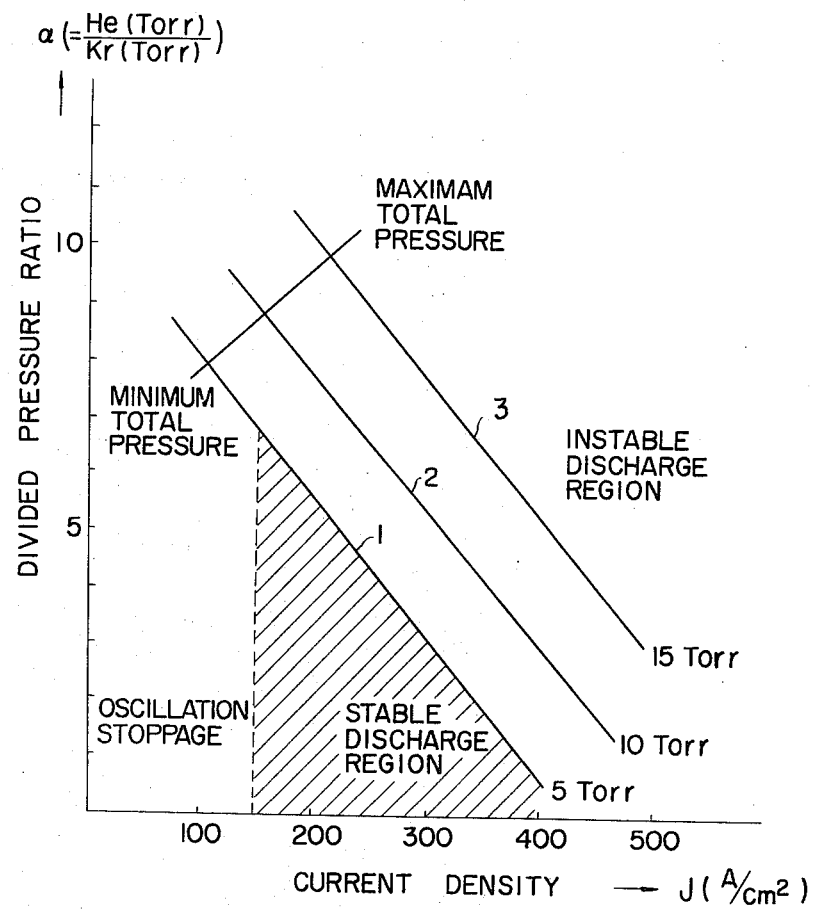
FIG. 1 is a graphical representation showing the relationship between the divided pressure ratio of helium with respect to krypton and the current density to create a stable discharge state.

1. FIG. 1 shows the results of experiments on the stable discharge region and instable discharge region in relation to the divided pressure ratio $\alpha$ = He (Torr)/Kr (Torr) and the current density J (A/cm$^2$) for the d.c. excitation, in which the lines 1, 2, and 3 are respectively the results of measurements at the total mixture gas pressure of 5, 10, and 15 Torr in the discharge tube.

From this graphical representation, it will be understood that, as the total mixture gas pressure increases, the stable discharge region, the divided pressure ratio of helium to krypton, and the current density become increased, however, at the current density J of below 150 A/cm$^2$ or above 400 A/cm$^2$, the instable discharge region becomes dominant.

Figure 2:
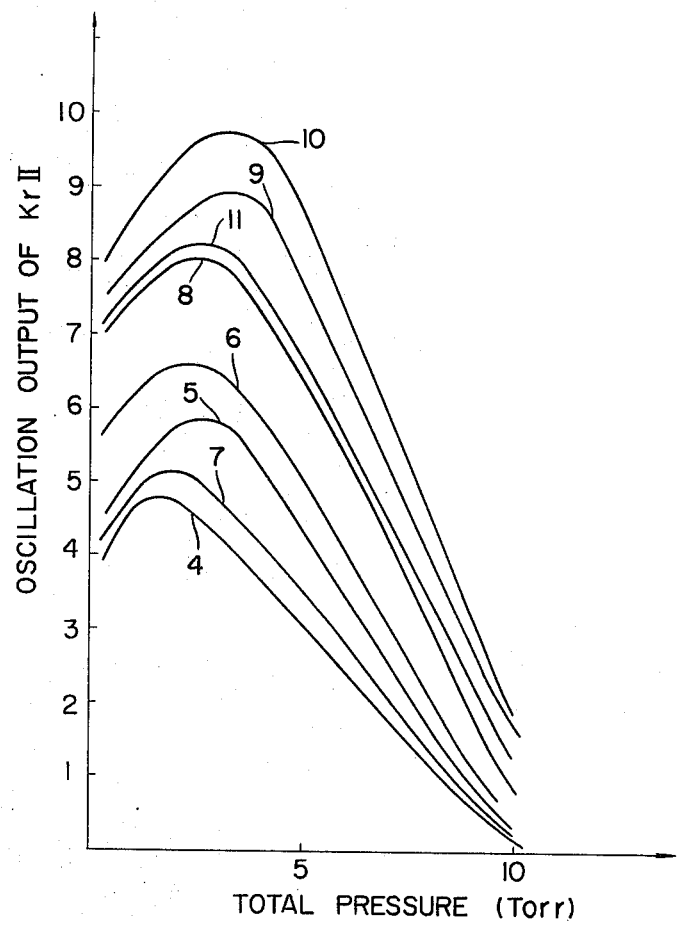
FIG. 2 is a graphical representation showing the relationship between total gas pressure of Kr + He mixture gas and the oscillation output of Kr$^+$II.

2. FIG. 2 shows the relationship between the total mixture gas pressure of the He/Kr mixture gas in the capillary discharge tube and the oscillation output of Kr$^+$II, in which the abscissa denotes the filling pressure of the mixture gas, and the ordinate shows the oscillation output of Kr$^+$II. The curves 4, 5, 6, and 7 respectively show the oscillation output of Kr$^+$II when it is excited in a capillary tube of 4mm inner diameter with direct current of 25A, in which the curve 4 is the oscillation output obtained from krypton gas alone; the curve 5 is the oscillation output of Kr and He mixture gas with helium filled in at the divided pressure ratio of twice as large as that of krypton; the curve 6 is the result when helium is at a divided pressure ratio three times as large as that of krypton; and the curve 7 is the result when helium is at a divided pressure ratio five times as large as that of krypton.

The curves 8, 9, 10 and 11 respectively indicate the oscillation output of Kr$^+$II when it is excited in a capillary tube of 4mm inner diameter with direct current of 35A, in which the curve 8 is the oscillation output obtained from krypton gas alone; the curve 9 is the oscillation output of mixed krypton/helium gas with the divided pressure ratio of helium twice as large as that of krypton; the curve 10 is the result when helium is at a divided pressure ratio three times as large as that of krypton; and the curve 11 is the result when helium is at a divided pressure ratio five times as large as that of krypton.

From these curves, it will be apparent that the oscillation output becomes extremely low when the gas pressure exceeds 10 Torr.

DESCRIPTION OF PREFERRED EMBODIMENT

Now, the preferred embodiment of this invention will be explained hereinbelow with reference to the drawing.

Figure 4:
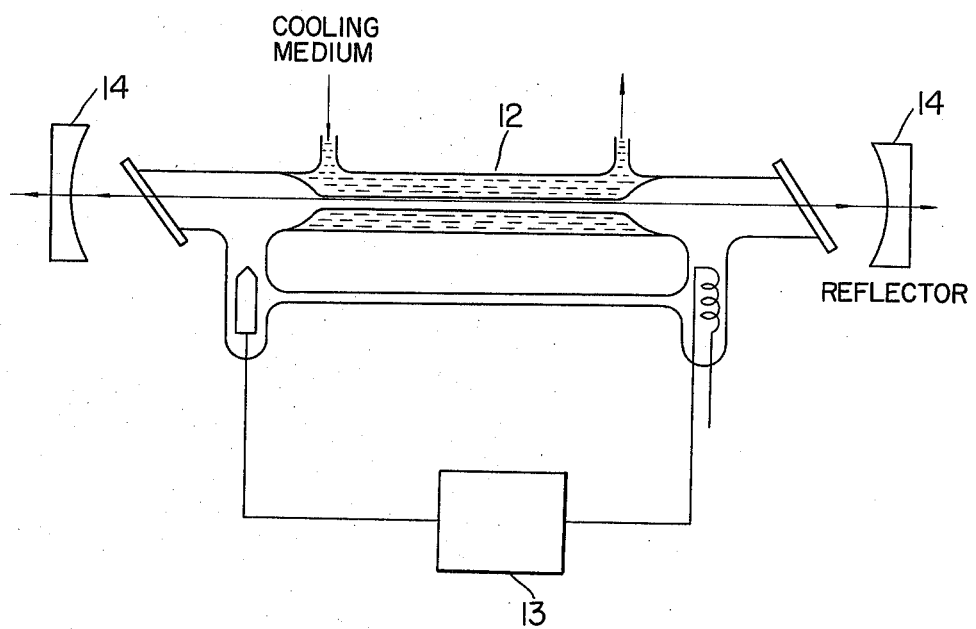
FIG. 4 shows a structure of a discharge tube for use in gas laser oscillation according to the present invention.

Referring to FIG. 4, the discharge tube to be used in the present invention is constructed with a capillary discharge tube 12 of water-cooled type having the inner diameter of 4 mm and the length of 400 mm, a pair of light transmission windows, each being disposed at both ends of the discharge tube and having mutually the Brewster's relationship, and a pair of discharge electrodes.

In such a discharge tube, a mixture of krypton and helium gases is filled at the respective pressures (Torr) as indicated in the following Table, then the electrodes of the discharge tube are connected to a d.c. power source 13 capable of applying to the tube an electric current having a current density of from 150 to 500 A/cm$^2$ and the light generated by discharge due to electric power imparted to the discharge tube through the discharge electrodes is subjected to multi-reflection by a pair of reflectors 14 disposed at external positions of the discharge tube in alignment with the axis thereof, one of which partially causes Kr$^+$II light to transmit therethrough, and the other of which totally reflects the light, whereby laser oscillation is caused.

| Gas: Specimen | He (Torr) | Kr (Torr) |
| --- | --- | --- |
| 1 | 3.6 | 1.2 |
| 2 | 2.1 | 1.8 |
| 3 | 1.2 | 2.4 |
| 4 | 2.4 | 1.2 |
| 5 | 0 | 3.6 |

Figure 3:
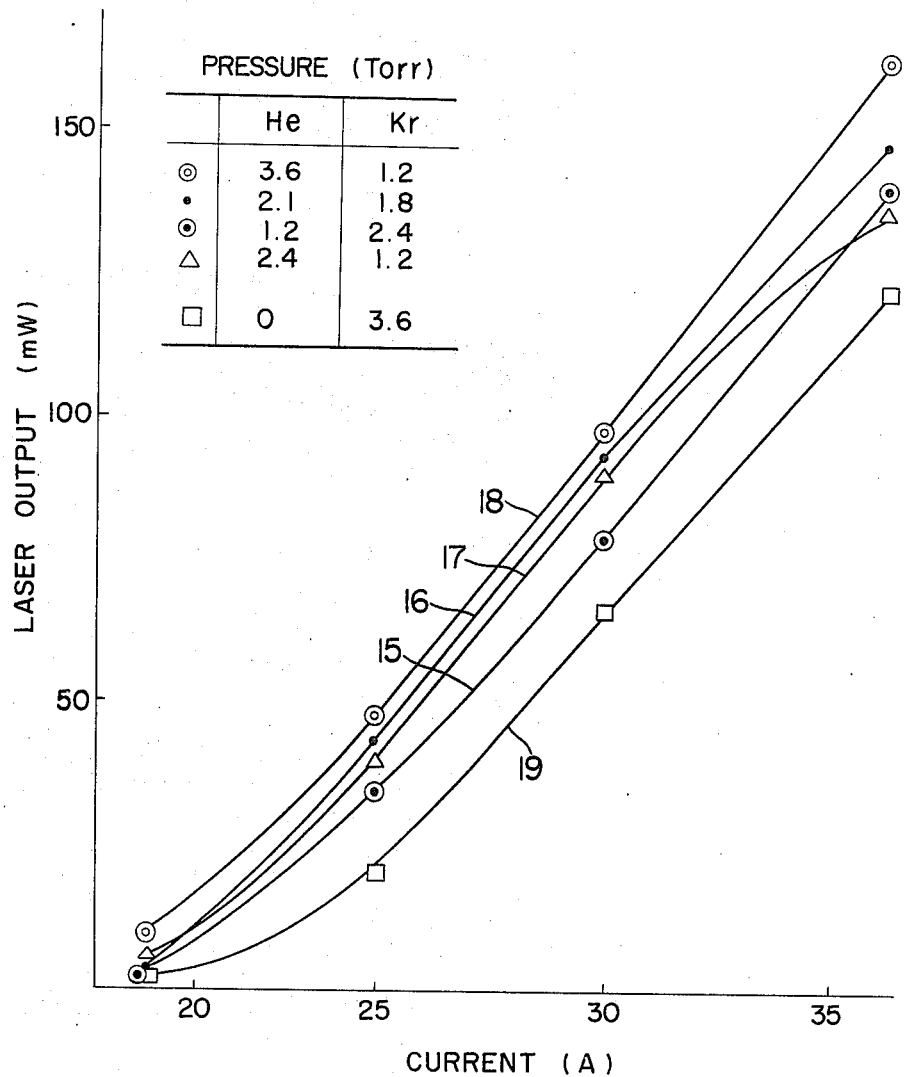
FIG. 3 shows characteristic curves of current versus laser output of Kr$^+$ ion laser.

The characteristic curves of the laser output to be obtained in this case are shown in FIG. 3, wherein the abscissa represent the current value to be applied to the electrodes, and the ordinate represents the laser output (mW of unit). In this graphical representation, the curves 15 – 18 indicate the results wherein helium is mixed with krypton at a divided pressure ratio of 0.5–3.0/1 (He/Kr) and the curve 19 indicates the result of using krypton alone. In either case, the laser light output depends not only on the mixing ratio of the gases but also on the pressure per se. The pressure used for obtaining the results as shown by the characteristic curves is relatively close to the optimum values. According to the experimental results thus obtained, it is recognized that, at the same current value, the laser light output becomes larger in the case of mixing helium with krypton at the pressure ratio of 0.5 – 5 times to krypton than in the case of using krypton gas alone.

It is generally observed that, when the mixing quantity of helium increases, the laser output tends to increase according as the mixing ratio of helium to krypton gas increases. However, if the mixing ratio of helium becomes excessively high, there inevitably takes place segregation phenomenon of different gases. Under such conditions, the gas pressure within the discharge tube deviates from its optimum point to cause lowering of the laser output; moreover, there are brought about various troubles such that spatial inhomogeneity in the discharge resistance causes local heating which damages the discharge tube, and so forth. In general, it is not advisable to mix helium with krypton at a divided pressure ratio of more than 5.0 with respect to krypton, although it may be permitted to further increase the mixing ratio of helium in case of operating the discharge tube with alternating power source, because, unlike the d.c. discharge, no cataphoresis and segretation of different gases occur in this case.

As mentioned in the foregoing, when the ion laser is oscillated with a mixture gas of krypton and helium, the following advantages accrue: (a) the laser light output can be increased higher than in the case of using krypton gas alone; and (b) the discharge can be stabilized by mixing helium. The reason for these advantages is that, when the cataphoresis occurs, there is inevitably created a large pressure gradient in the space within the discharge tube in case of using krypton gas alone with the consequent generation of instability in discharge due to the pinch effect at a portion of lower pressure in the discharge tube; however, when helium is mixed with krypton, such pressure gradient becomes difficult to appear owing to the diffusion speed of helium being much faster than that of krypton, hence the discharge is considered to be much more stabilized.

What we claim is :

1. A method for generating continuous laser oscillation of krypton ion (Kr$^+$II) in a gas laser discharge tube having a pair of reflectors disposed in parallel spaced-apart relationship, a pair of light-transmitting windows provided at both ends of the discharge tube interposed between said pair of reflectors, and a capillary discharge tube having an anode and cathode, said method comprising the steps of: filling a mixture gas of krypton and helium into the capillary discharge tube such that the total mixture gas pressure is lower than 10 Torr and the helium pressure measured in Torr is from 0.5 to 5 times that of krypton pressure; applying direct current power to the mixture gas of krypton and helium in said capillary discharge tube through the anode and cathode at a current density of from 150 to 400 A per cm$^2$ of cross-sectional area of the discharge tube to effect an electric discharge thereby exciting krypton atoms in the mixture gas to create population inversion between the levels 5P and 5S in the energy diagram of Kr$^+$II; and carrying out continuous laser oscillation by the transition from the 5P level to the 5S level.

2. A gas laser device for continuous laser oscillation of Kr$^+$II gas comprising:
a pair of reflectors disposed in parallel spaced-apart relationship; a capillary discharge tube interposed between said reflectors; light-transmitting windows provided at both ends of said capillary tube; an anode and a cathode extending into said capillary tube; a discharge gas composed of a mixture of krypton and helium gases filled in said capillary tube at a total mixture gas pressure not exceeding 10 Torr and wherein the helium pressure measured in Torr is from 0.5 to 5 times that of the krypton pressure; and power applying means connected to said anode and cathode of the capillary discharge tube for applying direct current power to said discharge gas through said anode and cathode at a current density of from 150 to 400 A per cm² of cross-sectional area of said discharge tube to create population inversion between the energy levels of 5P and 5S in the energy diagram of krypton ion gas to thereby obtain continuous laser oscillation.

3. The device according to claim 2; wherein said pair of light-transmitting windows are mutually disposed to satisfy the Brewster angle relationship.

* * * * *